United States Patent
Blonigen et al.

[19]

[11] Patent Number: 5,876,654
[45] Date of Patent: Mar. 2, 1999

[54] METHOD FOR SHAPING HONEYCOMB CORE

[75] Inventors: Bradley J. Blonigen, Wichita; William T. Ross, Cheney, both of Kans.

[73] Assignee: The Boeing Company, Seattle, Wash.

[21] Appl. No.: 857,099

[22] Filed: May 15, 1997

Related U.S. Application Data

[62] Division of Ser. No. 545,190, Oct. 16, 1995, Pat. No. 5,780,074.

[51] Int. Cl.$^6$ ............................ B29C 51/08; B29C 53/04
[52] U.S. Cl. ......................... 264/316; 72/465.1; 264/321; 264/322; 425/394; 425/397
[58] Field of Search ...................................... 425/394, 397; 264/316, 313, 321, 322, 328.2; 72/465.1

[56] References Cited

U.S. PATENT DOCUMENTS

| | | |
|---|---|---|
| 2,385,544 | 9/1945 | Salisbury . |
| 3,658,974 | 4/1972 | Low .......................................... 264/316 |
| 4,622,190 | 11/1986 | Schultz ..................................... 264/316 |
| 4,885,317 | 12/1989 | Thein et al. . |
| 5,084,226 | 1/1992 | Tarlton et al. . |
| 5,119,535 | 6/1992 | Gnagy et al. . |
| 5,529,480 | 6/1996 | Ross et al. . |

FOREIGN PATENT DOCUMENTS

| | | |
|---|---|---|
| 0 393 767 A2 | 10/1990 | European Pat. Off. . |
| 41 30 620 A1 | 9/1991 | Germany . |
| 53-112960 | 10/1978 | Japan . |
| 3036003 | 5/1991 | Japan . |
| WO 95/03933 | 2/1995 | WIPO . |

*Primary Examiner*—Jan H. Silbaugh
*Assistant Examiner*—Mark Eashoo
*Attorney, Agent, or Firm*—Christensen O'Connor Johnson & Kindness, PLLC

[57] ABSTRACT

A method of shaping a layer of settable material such as honeycomb core (24) including placing the core on a flexible support (38); translating the flexible support (38) and core into an oven (28); heating the core to a desired forming temperature in the oven; translating the flexible support (38) and core (24) horizontally from the oven into a forming area (26); lowering a contoured upper die (32) onto the core (24); tensioning the flexible support (38); pressing the core between the tensioned flexible support and the upper die so that the core (24) is forced to conform to the shape of the die (32); cooling the core to set temperature; and raising the die (32) to remove the finished shaped core, is provided. Additionally, a shaping apparatus (22) located in a forming area (26) adjacent an oven (28), for shaping a settable material such as honeycomb core (24) is provided, including: an upper die (32); first and second tensioning assemblies (70), (72) each including a torque supply system; first and second guide assemblies (50), (52) for translating the tensioning assemblies into and out of the oven (28); at least one flexible support (38) wrapped around and between the tensioning assemblies (70), (72) upon which the core may be placed; a regulation system for equalizing tension about the core during pressing; and optional support rollers (166) for focusing the flexible support (38) against the upper die (32) during pressing. A tensioning assembly including a roller (76) and a torque supply system having an air motor (84), is provided. Alternatively, a tensioning assembly including a number of short rollers (92) each powered by a torque supply system having an air motor (108); and a like number of tensioning sub-assemblies (90) each having multiple flexible belts (96) attached thereto, is provided.

16 Claims, 13 Drawing Sheets

METHOD FOR SHAPING HONEYCOMB CORE

This is a divisional of the prior application Ser. No. 08/545,190, filed Oct. 16, 1995, now U.S. Pat. No. 5,780,074, the benefit of the filing date of which is hereby claimed under 35 U.S.C. §120.

FIELD OF THE INVENTION

The present invention relates to methods and apparatus for shaping settable materials, and more particularly to a method and apparatus for shaping flat honeycomb core into a predetermined contour shape.

BACKGROUND OF THE INVENTION

The current method of shaping honeycomb core includes placing the core on a series of horizontal support rods and sliding the combination into an oven. The core is heated to its forming temperature, i.e., the particular temperature at which the core becomes shapable. Once the core is properly heated, the support rods and core are removed from the oven and the rods are retracted laterally to either side. This causes the core to fall loosely onto a lower die. There, a worker correctly aligns the core relative to the die. Next, the heated core is pressed for a period of time between the lower die and an upper die that is shaped in the reverse-image of the lower die (i.e., male/female die pair). After pressing the hot core, the dies continue to hold the core until it cools to a set temperature. Once set, the dies recede, and the shaping process is complete.

There are a number of disadvantages associated with the current method. A first disadvantage involves the forming temperature. The core must be heated to a particular temperature in order to bring it to a malleable state. The time spent retracting the rods and placing the core on the lower die allows the core to cool. A transfer of the core heat to the lower die begins when the core is transferred to the lower die. These steps lower the initial core temperature and must be accounted for by increasing the oven temperature to compensate for the anticipated heat loss and by requiring the worker to accurately position the core on the lower die in a short period of time. Both are disadvantageous: increased heat requires more energy and less temperature precision, short placement time decreases accuracy. Even if the initial temperature of the core is correctly adjusted, the forming temperature is adversely affected because the lower die continues to absorb heat from the core. This reduces the amount of time available for pressing the core at required forming temperature.

A second disadvantage with the current method involves cooling time. After the core has been pressed at its proper forming temperature for the required amount of time, the core must be allowed to cool to a particular temperature while being held at its new shape. If the core is released prior to reaching this temperature, it will tend to return (i.e., spring back) toward its original shape. This cool down period is longer than desired when using the current method due to the slow rate of heat dissipation from the dies.

A third disadvantage of the current method is the requirement for a worker to accurately position the hot core on the lower die prior to pressing. Human aligning is often imprecise, and typically worsens in time critical activities.

Prior art attempts to solve the above disadvantages have been unsuccessful. U.S. Pat. No. 5,084,226 describes a method of shaping a sheet of thermoplastic material by placing the material on a flexible support and heating the material and the support in an oven. Tension is applied to the support to force it to remain substantially horizontal during heating. Once removed from the oven, tension on the support is relaxed. This allows the material and support to drop into a lower female former (i.e., a female die), where the weight of the material itself forces the material to adopt the shape of the female die. This method is inadequate for shaping honeycomb core, because the weight of honeycomb core is insufficient to force the core to permanently adopt the shape of a die. This method also fails to overcome the disadvantages of core heat transfer to the die and slow heat dissipation from the die during cooling.

Based on the foregoing, it will be appreciated that there is a need for a shaping method and apparatus that provides fast and accurate transfer of a heated honeycomb core to a shaping mechanism, minimizes the heat loss of the core during forming of the core, and maximizes the heat loss of the core during the cooling period. The present invention is directed to fulfilling this need.

SUMMARY OF THE INVENTION

In accordance with the present invention, a method of shaping a layer of settable material, such as a honeycomb core, is provided. The method includes: placing the core on a flexible support; translating the flexible support and core into an oven; heating the core to a desired forming temperature; translating the support and core horizontally from the oven into a forming area; lowering a contoured upper die onto the core; tensioning the flexible support; shaping the core by pressing the core between the upper die and the tensioned flexible support so that the core is forced to conform to the shape of the upper die; cooling the core to set temperature; and raising the upper die to remove the finished formed core.

Alternatively, shaping of the core is accomplished by maintaining the core on the flexible support and pressing the core and the support between an upper and a lower die, during which time no tensioning of the flexible support is provided.

In accordance with further aspects of the present invention, an apparatus for shaping a layer of honeycomb core is provided. The apparatus is located in a forming area adjacent an oven. The apparatus includes an upper die capable of translating downward. The apparatus also includes first and second tensioning assemblies, each having an elongate tray supporting a torque supply system and at least one roller. The tensioning assemblies are positioned opposite each other, oriented such that the roller axes of rotation are parallel. Wrapped around and extending between the rollers of the tensioning assemblies is a horizontal flexible support for supporting a layer of settable material, such as a honeycomb core. The tensioning assemblies are mounted on guide assemblies suitable for translating the tensioning assemblies into and out of the oven. The apparatus further includes a regulation system for coordinating torque between opposite rollers of the first and second tensioning assemblies to ensure even tensioning of the flexible support around the core during pressing.

Alternatively, rather than a single upper die, the apparatus of the present invention includes upper and lower multi-faceted dies that are reverse images of one another. In this embodiment, the air regulation system eliminates tension in the flexible support when a workpiece, i.e., a layer of settable material, is compressed between the dies.

In accordance with other aspects of this invention, each guide assembly includes a ball screw operated by an electric motor, the ball screw being housed in a rail support having dual male rails mounted to its upper surface. The guide assembly further includes a ball mount engageable with the ball screw and attachable to a lower surface of a tensioning assembly; and dual female rails mounted to the tensioning assembly lower surface, the female rails being engageable with the male rails. The ball screw translates the ball mount causing the tensioning assembly to translate along the rails.

In accordance with still further aspects of this invention, the tensioning assembly is designed for use with a simple upper die having convex curvature in one plane and no variation in cross-section along the direction normal to that plane. This embodiment of the tensioning assembly includes a single roller supported on an elongate tray and an air motor for supplying torque to the roller. This embodiment includes a single horizontal flexible support wrapped around each of the rollers of the first and second tensioning assemblies. During shaping, the regulation system coordinates torque between rollers of the first and second tensioning assemblies. This causes the flexible support to maintain constant tension about the core during pressing, without imparting any sideways motion due to one roller having more torque than the other roller. A variation of the numbers of rollers and flexible supports, and their placement in the tensioning assembly, is provided.

In accordance with alternative aspects of this invention, the tensioning assembly is designed for use with a complex upper die having convex curvature in any plane. This embodiment of the tensioning assembly includes a number of independent short rollers and an equal number of air motors. The air regulation system coordinates torque between both adjacent and opposite rollers by supplying each air motor with equal values of air pressure. Engaged with each short roller is a tensioning sub-assembly. Instead of a single flexible support, multiple flexible belts are provided. The belts are divided into equal groups, the belts of one group being secured to components of a single tensioning sub-assembly.

In accordance with yet further aspects of this invention, the tensioning sub-assemblies include a housing having therein a pulley system to extent and retract individual flexible belts including an internal cable interlinking a number of stationary spools to a number of rods housed in translating brackets. The stationary spools are each attached to the housing. The translating brackets are guided by channels in the housing and are each attached to one end of a flexible belt. During pressing, the tensioning sub-assembly allows each translating bracket and flexible strip to move independent of one another, while distributing applied tension between the individual flexible belts via the interlinking internal cable.

In accordance with other further aspects of this invention, optional first and second support rollers are provided to keep the flexible support at a particular height during pressing, when using a narrow width simple or complex upper die. The support rollers are attached to frames supported by the floor, and are positioned directly beneath the flexible support. The exact location of the support rollers may be adjusted to accommodate a particular upper die shape.

As will be appreciated by those skilled in the art, utilization of a flexible support to transfer the core to the oven and support the core during forming provides a faster method of shaping the core, since there is no need to wait for support rods to retract or to wait for a worker to properly adjust the location of a core with respect to a lower die. Using a flexible support can result in the elimination of a lower die for some core shapes. This provides the advantages of: eliminating the mismatch that occasionally occurs between two dies; lowering tooling costs; decreasing tool setup time; and eliminating the hand-aligning of the core on a lower die. The flexible support adds the benefits of less heat loss during pressing and faster heat dissipation during cooling.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Although the following detailed description of the presently preferred embodiment of the invention is presented with reference to a workpiece in the form of a layer of honeycomb core material, it is to be understood that other settable materials may benefit from use of the present invention. Therefore, even though the present invention shaping method and apparatus was developed and is described herein for use with honeycomb core, it is to be understood that the present invention may also be useful in the formation of other settable materials, e.g., foam sheets, thermoplastic sheets, etc.

The general method and apparatus of the present invention involves placing a layer of honeycomb core on a flexible support, translating the flexible support and core into an oven, and heating the core to its proper forming temperature in the oven. Once core heating is accomplished, the support and core are translated horizontally out of the oven into a forming area.

At the forming area, a contoured upper die is vertically lowered onto the core, pushing the core and the flexible support downward. Tensioning assemblies maintain the tension of the flexible support so that the core is pressed between the upper die and the flexible support and thereby being forced to conform to the shape of the upper die. After pressing, the arrangement is allowed to cool. The die is then raised and the finished, shaped core is removed. This general method and apparatus of the present invention is subject to a number of variations. The variations are discussed below. In general, the variations relate to the shape of the contoured die.

As will be readily appreciated by those skilled in the art, utilizing a flexible support to transfer a honeycomb core to an oven and support the core during forming provides a faster method of shaping the core, since there is no need to wait for support rods to retract or to wait for a worker to properly adjust the location of the core with respect to a lower die. In addition, using a flexible support can result in elimination of a lower die for some core shapes. This benefit is discussed in detail below.

Figure 1:
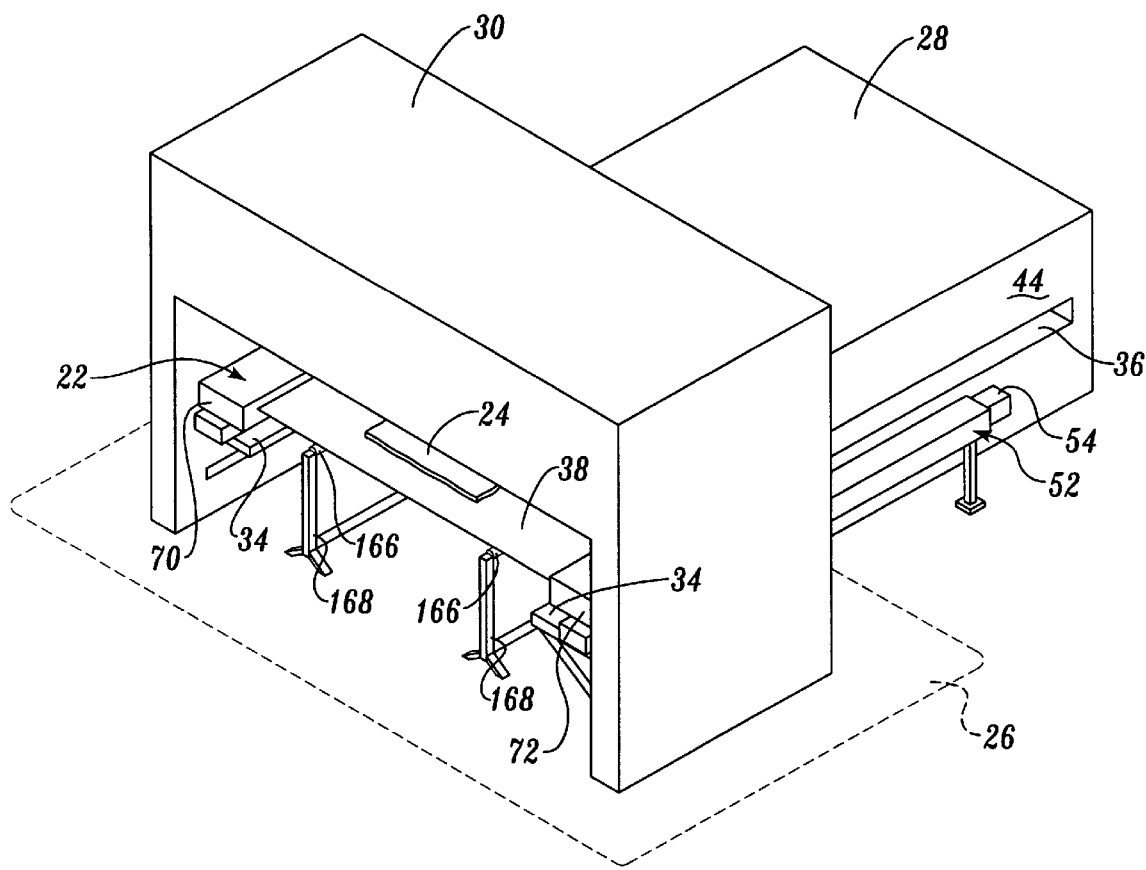
FIG. 1 is a perspective view of an oven and a shaping apparatus formed in accordance with the present invention.
Figure 2:
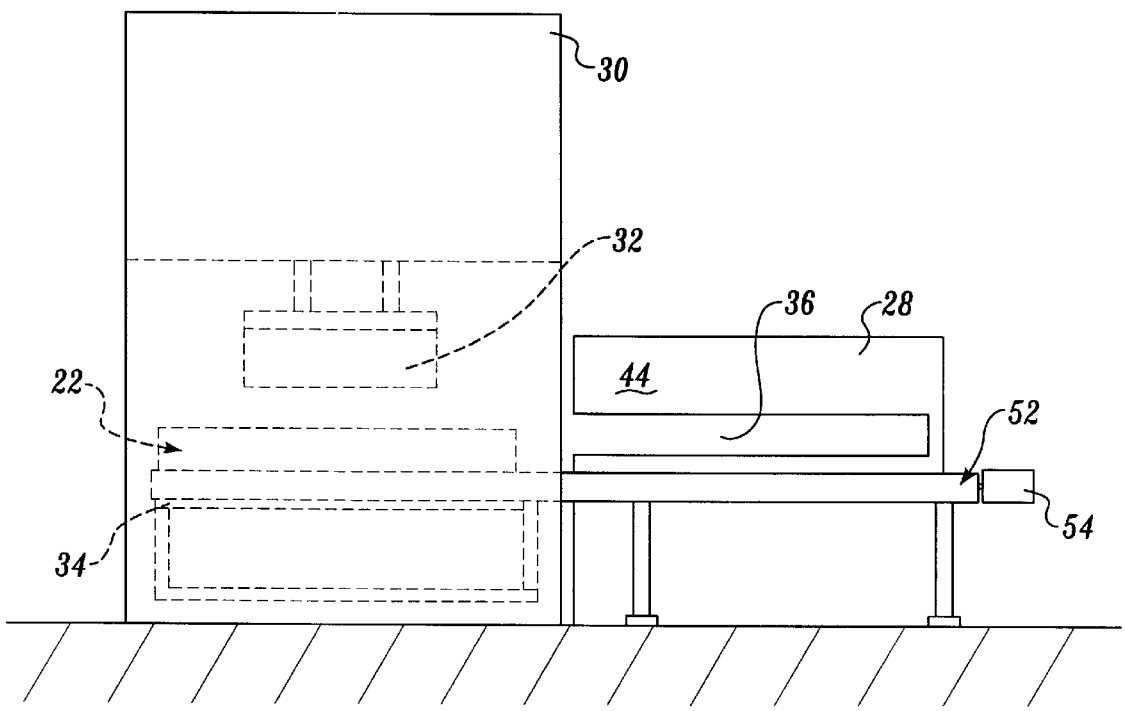
FIG. 2 is a side elevational view of the arrangement of FIG. 1.

FIGS. 1–4 show a shaping apparatus 22 formed in accordance with the present invention. Unnecessary details have been eliminated in order for the invention to be more easily understood. Also shown in FIGS. 1–4 is a conventional oven 28 having a horizontal opening 36 for receiving items to be heated. The horizontal opening 36 extends around three sides of the oven (front side 40, left side 42, and right side 44). A forming area 26 is defined by the area directly adjacent the oven front side 40, spanning the oven's width as shown in FIG. 1.

Still referring to FIGS. 1–4, the shaping apparatus 22 is located in the forming oven 26 and includes a die assembly 30 having a vertically translatable upper die 32. The die assembly is generally of a known type, however, variations are required for its use with the present invention. These variations are discussed below. The vertical translation of the die 32 may be accomplished using any one of a number of known methods and power supplies, including a hydraulic press, an electric motor, a manual mechanical pulley system, etc. The precise translation mechanism is not particularly important to the present invention. What is important is that the placement and orientation of the die is such that when the upper die is lowered by the vertical translation mechanism onto a heated core to be shaped, the die is appropriately aligned with the core.

The shaping apparatus 22 of the present invention includes first and second tensioning assemblies 70, 72 supported by first and second guide assemblies 50, 52, respectively, both oriented parallel to and near the oven left and right sides 42, 44, respectively. See FIG. 3. First and second preferred embodiments of the tensioning assembly of the present invention are provided and described in detail below. Each tensioning assembly 70, 72 includes an elongate tray 74 supporting a torque supply system, and at least one roller 76 (see FIGS. 11–14). The tensioning assemblies 70, 72 are generally rectangular in shape, having a front end 78 and a rear end 80. The torque supply system may include any mechanism capable of being back driven while engaging a roller and capable of providing a specific torque to the roller.

Figure 5:
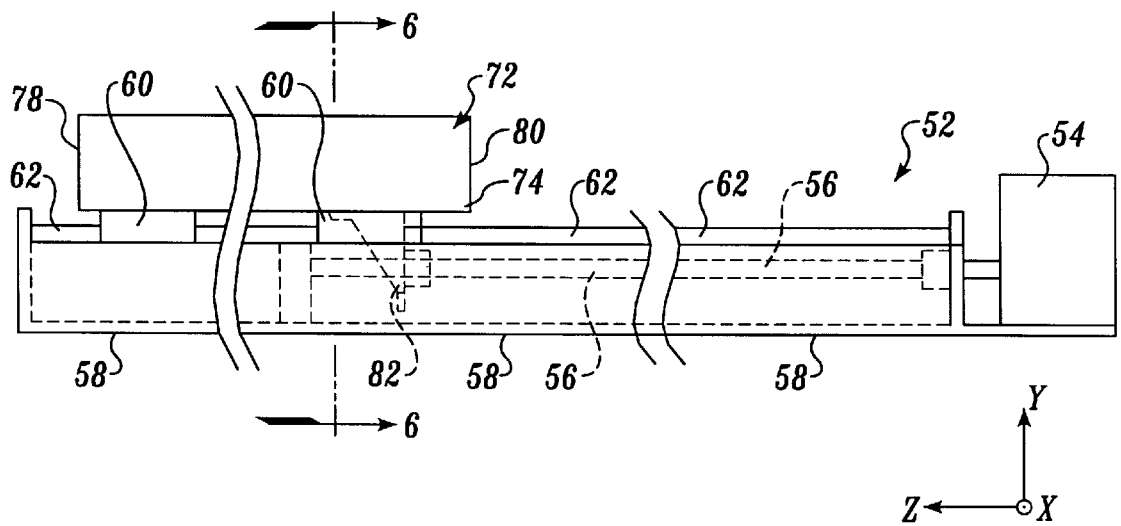
FIG. 5 is a side elevational view of a guide assembly formed in accordance with the present invention.
Figure 6:
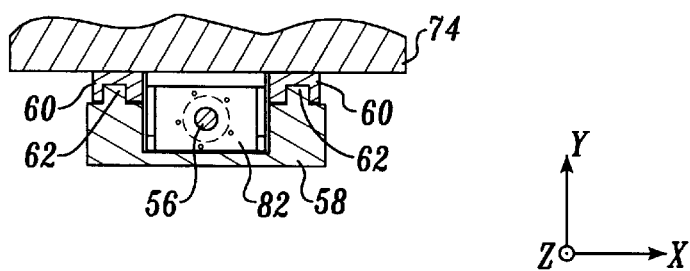
FIG. 6 is a cross-sectional view along line 6—6 of FIG. 5.

The first and second guide assemblies 50, 52 may be formed as one of a number of conventional translation arrangements. Shown in FIGS. 5 and 6, is a ball screw arrangement where an electric motor 54 drives a ball screw 56 housed in a rail support 58. The rear ends 80 of the first and second tensioning assemblies 70, 72 are engaged with the first and second guide assemblies 50, 52, respectively, via ball nut mounts 82 capable of translating along the rotating ball screw. The first and second guide assemblies 50, 52 further include a pair of female linear rails 60 mounted to the underside of each tensioning assembly for engaging a pair of male linear rails 62 attached to the upper surface of each guide assembly rail support 58. The first and second guide assemblies of FIGS. 5 and 6 are located directly adjacent the left and right oven sides, one to a side. The upper edge of the rail support 58 preferably lies just below the horizontal oven opening 36.

Figure 12:
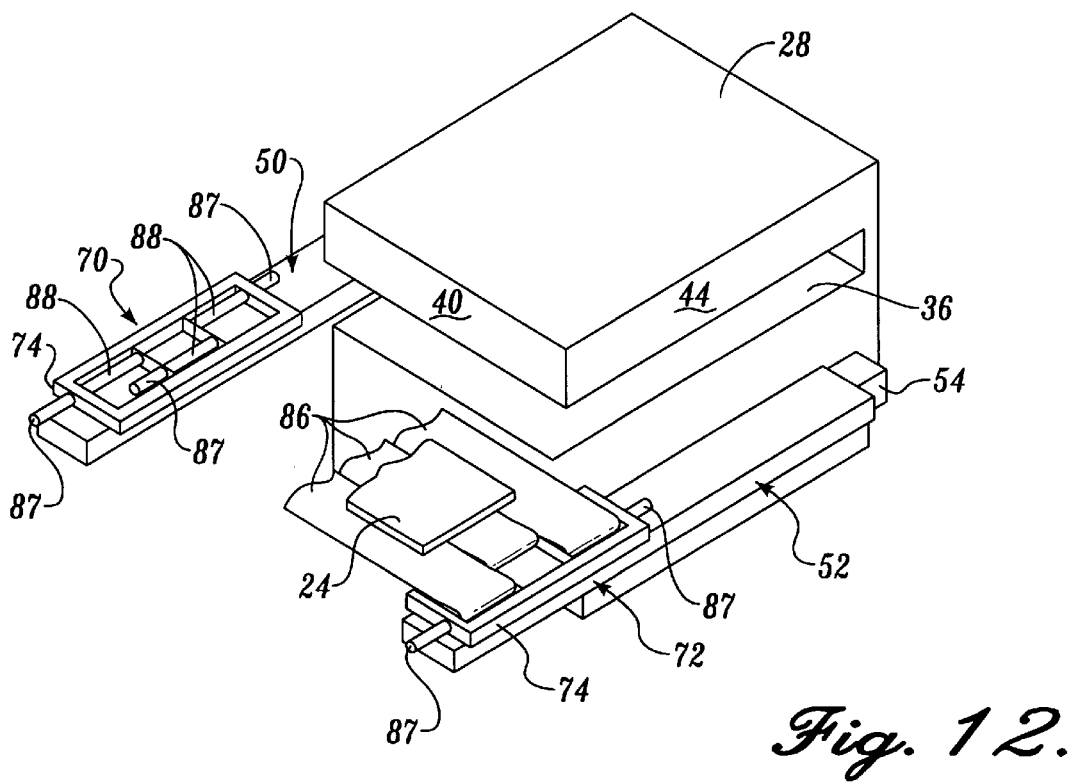
FIG. 12 is a perspective view of an alternative version of a first embodiment of a tensioning assembly formed in accordance with the present invention.

The electric motors 54 between the first and second guide assemblies 50, 52 are synchronized to ensure that translation of the tensioning assemblies is performed in unison. Synchronization may be accomplished using any one of a number of known methods. A simple method is shown in FIG. 12, where a synchronization bar 160 physically extends between the first and second tensioning assemblies to ensure like motion.

Located between the tensioning assemblies 70, 72 is a flexible support 38 having two side ends, one end is wrapped around the roller 76 of the first tensioning assembly 70, the other end is wrapped around the roller 76 of the second tensioning assembly 72. During honeycomb core pressing, the flexible support 38 remains under the honeycomb core 24, additional flexible support material unwinding off the rollers as required. The flexible support may be formed of any heat resistant flexible material, the preferred material being a fine-link stainless steel wire mesh capable of withstanding at least 750° F.

The width (X-direction length) of the flexible support 38 is sufficient to span the distance between the tensioning assemblies and wrap around the rollers a number of times. The depth (Z-direction length) of the support is at least as great as the core and die that are to be pressed together, but smaller than the depth of the oven. Exemplary measurements of the flexible support are 5-feet by 12-feet, where the die is 7-feet by 4-feet, and the oven can accommodate a 4-foot by 8-foot by 3.5-inch object. A support shelf 34 (see FIG. 3) supports the tensioning assembly at a height (Y-direction) such that the flexible support and core may freely translate into and out of the oven horizontal opening 36 without disruption.

The shaping apparatus 22 of the present invention further includes a regulation system for coordinating the torque produced within and between the torque supply systems of the first and second tensioning assemblies 70, 72. The regulation system further keeps the side ends of the flexible support operating in unison. If flexible supports are not operated in unison, one tensioning assembly may react faster than the other tensioning assembly, or may be more powerful than the other one. Either situation would cause the one assembly to continuously pick up more slack in the flexible support. During pressing, it is important to keep even tension applied to the flexible support so that it does not shift sideways. Shifting of the flexible support could result in malforming the honeycomb core.

The regulation system may be any one of a number of conventional systems, depending on the tensioning assembly configuration and, in particular, the torque supply system selected. The specific size and type of regulating system is not discussed herein, that information not being particularly important to the present invention. What is important is that the chosen regulation system be capable of keeping even tension between opposed rollers.

The shaping apparatus 22 of the present invention may also include optional first and second support rollers 166. See FIG. 3. The support rollers are provided to keep the flexible support 38 at a particular height during pressing. This is necessary when the die is narrow in width compared with the distance between the tensioning assemblies. Without support rollers 166, the flexible support 38 does not properly press the core about the upper die, regardless of the applied tension.

Figure 3:
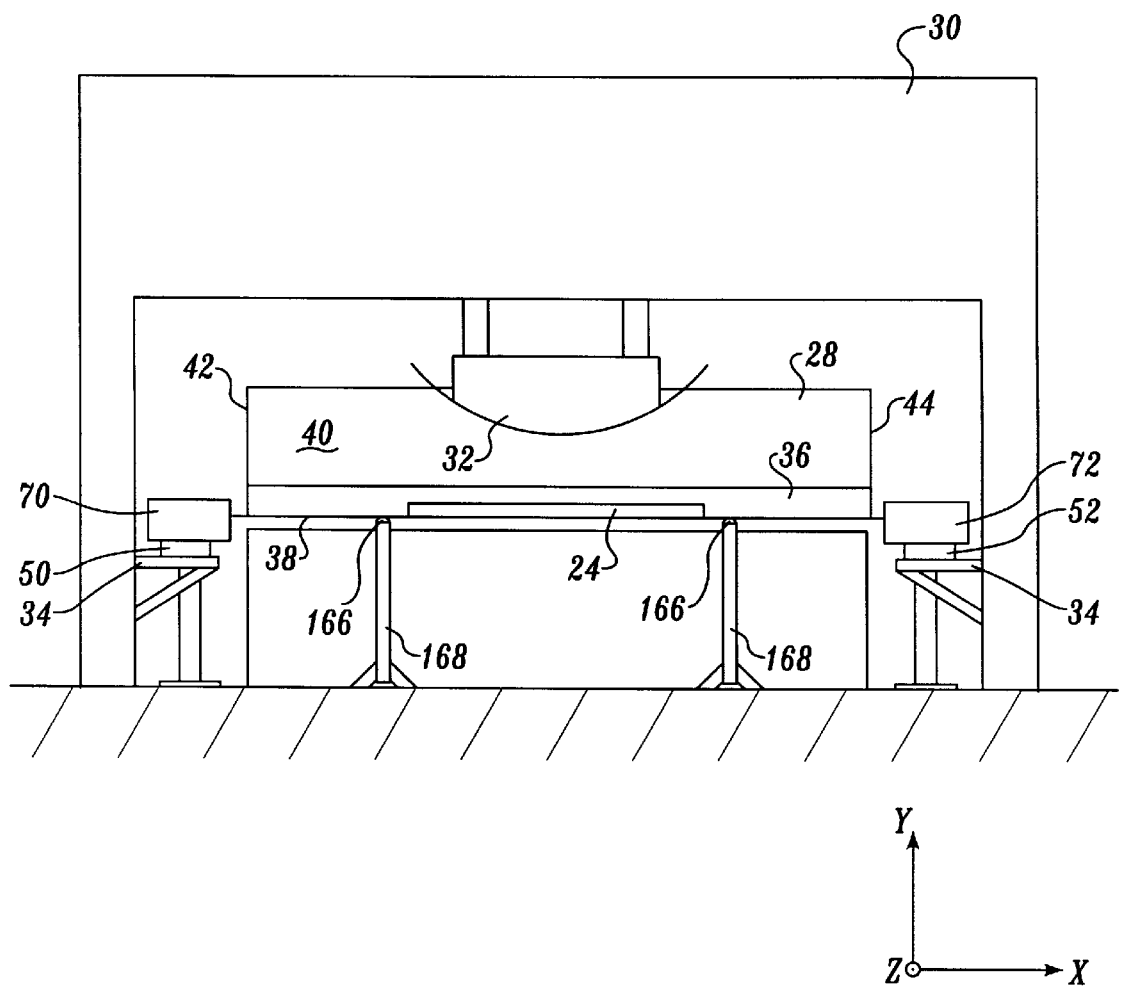
FIG. 3 is a front elevational view of the arrangement of FIG. 1.
Figure 4:
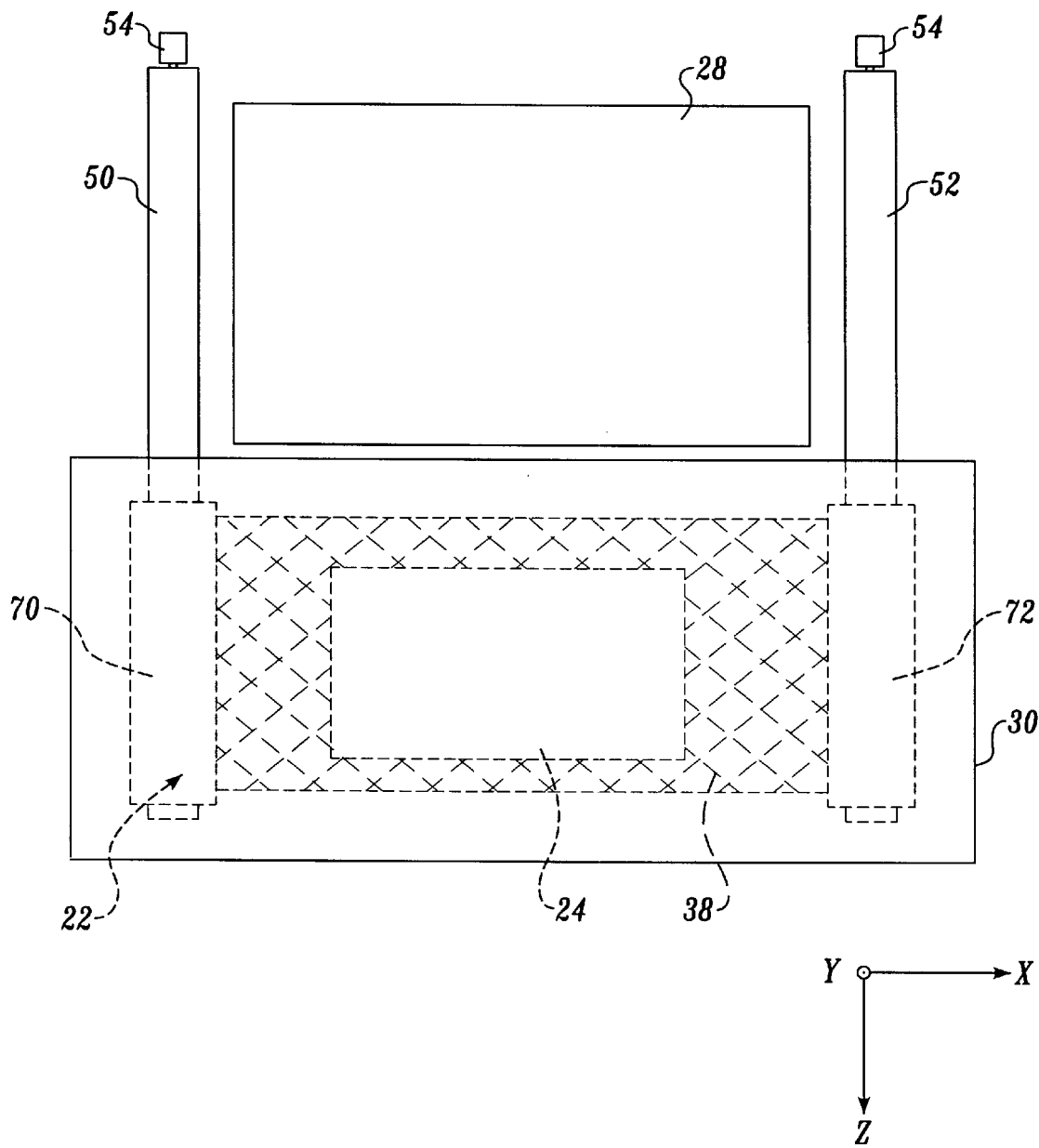
FIG. 4 is a top plan view of the arrangement of FIG. 1.

Shown in FIGS. 1 and 3, the support rollers 166 are mounted on vertically adjustable frames 168 that are supported by the floor. The support rollers and frame may be configured according to any one of a number of methods. The simple exemplary configuration of FIGS. 1 and 3 are basically weighted horses having the support rollers attached to a single rod that forms the upper horse cross member. A more complicated apparatus (not shown) may include support rollers attached to frames comprised of steel I-beams that are attached at their lower ends to a subfloor system of translating carriages, operated by hydraulic actuators. While the configuration selected is not particularly important to the present invention, it is desirable that at least the height of the rollers be adjustable.

Shown in FIGS. 1 and 3, the support rollers 166 and frames 168 are positioned under the flexible support 38 such that the support roller 166 is close to the underside of the flexible support. The support rollers 166 are spaced laterally out from directly beneath the edges of the upper die. The axes of the first and second support rollers are generally parallel to the axes of rotation of the tensioning assembly rollers. This orientation may change, however, depending on the shape of the die.

In operation, a workpiece in the form of a layer of honeycomb core 24 is placed on the flexible support 38. The air motors 54 are energized, causing the two, together, to be translated by the guide assemblies 50, 52 horizontally into the oven 28 via the oven opening 36. Because the oven opening extends around the oven front side 40 through both the left and right sides 42, 44, the flexible support 38 is smoothly translated into the oven without any portion of the core, or the flexible support, touching the oven. A portion of the support and the tension assemblies extend horizontally out from the sides of the oven opening.

Next, the core 24 is heated to its forming temperature. Afterwards, the core and support are translated horizontally out of the oven 28 back into the forming area 26. Then the upper die 32 is lowered onto the core, the upper die pushing the core into the flexible support. The first and second tensioning assemblies maintain the tension on the flexible support so that the core is forced to conform to the shape of the upper die. After the core cools to its set temperature, the die is raised and the shaping process is complete.

Figure 7:
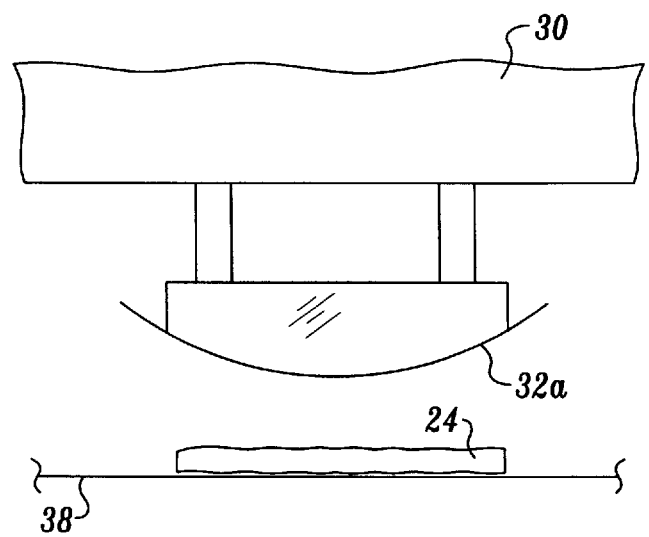
FIG. 7 is an elevational view of a first example of a simple convex contour upper die.
Figure 8:
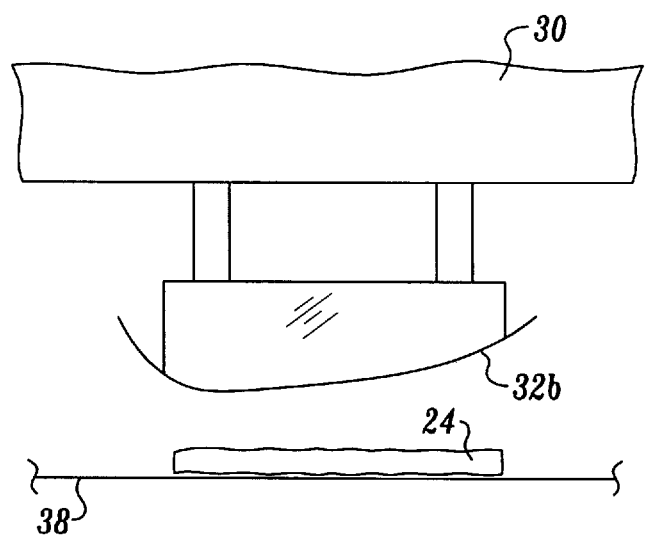
FIG. 8 is an elevational view of a second example of a simple convex contour upper die.

Further details of the present invention depend on the size and shape of the upper die. Generally, dies may be divided into three different types: simple convex dies having only convex curvature in only the X-Y plane and no variation in the Z-direction; complex convex dies having convex curvature in any plane; and multifaceted dies having either convex or concave curves, or both, in any plane. Examples of simple convex dies are shown in FIGS. 7 and 8. In FIG. 7, the die 32a is shaped similar to a side portion of a cylinder—the curvature of the die lying in the X-Y plane and the cross-sectional shape of the die experiencing no variation in the Z-direction, while in FIG. 8, the convex curvature of the die 32b is more complex, though still occurring in only the X-Y plane. The cross-sectional shape remains constant in the Z-direction.

Figure 9:
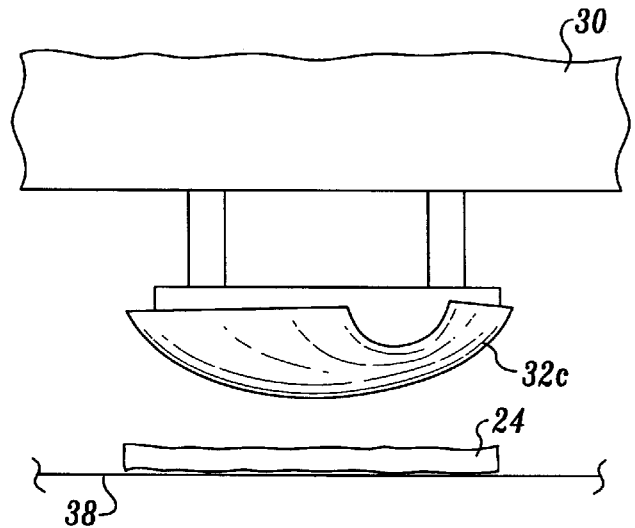
FIG. 9 is an elevational view of an example of a complex convex contour upper die.
Figure 10:
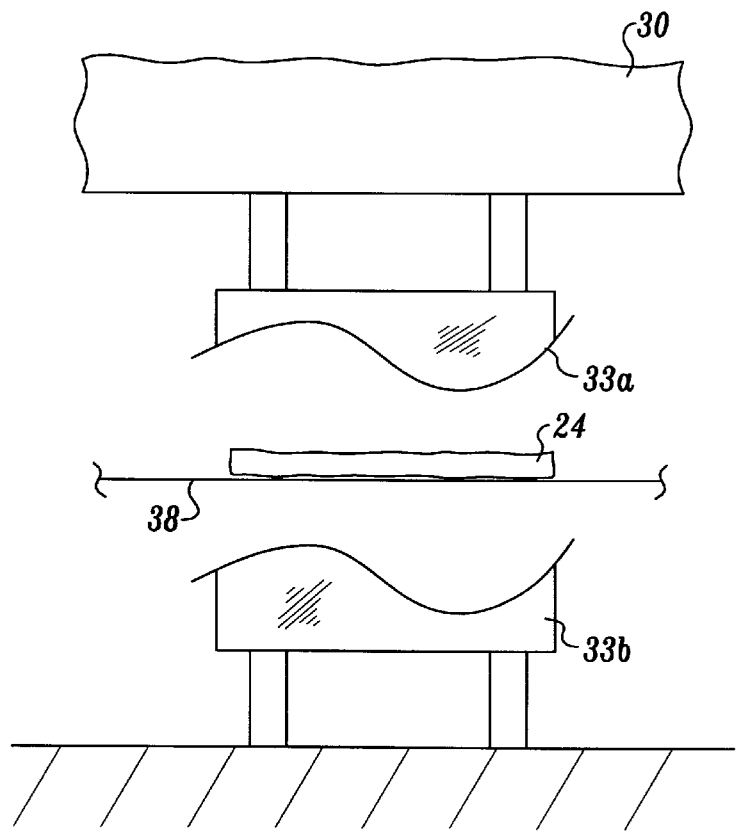
FIG. 10 is an elevational view of an example of a multi-faceted upper die and a reverse-image lower die.

An example of a complex convex die is shown in FIG. 9, where the die 32c is shaped similar to a half cone—the curvature of the die lying in the X-Y plane and the Z-direction shape varying linearly. An example of multifaceted dies is shown in FIG. 10. Rather than a single upper die, the multi-faceted die includes upper and lower dies 33a and 33b that are reverse-images of one another. Each multi-faceted die may include both convex and concave curves in any plane.

The type of die used to form a core will determine the tensioning method used and whether an additional, lower die 33b is required. Various types of tensioning mechanisms and their components, all formed in accordance with this invention, are illustrated in FIGS. 11–20 and described below. Simple convex honeycomb forms may use any of the hereinafter described tensioning assemblies with only an upper die. Complex honeycomb forms may be limited to the more complex tensioning assemblies, but with only an upper die. Multi-faceted honeycomb forms require the more complex tensioning assemblies, with a lower die as well as an upper die.

Figure 11:
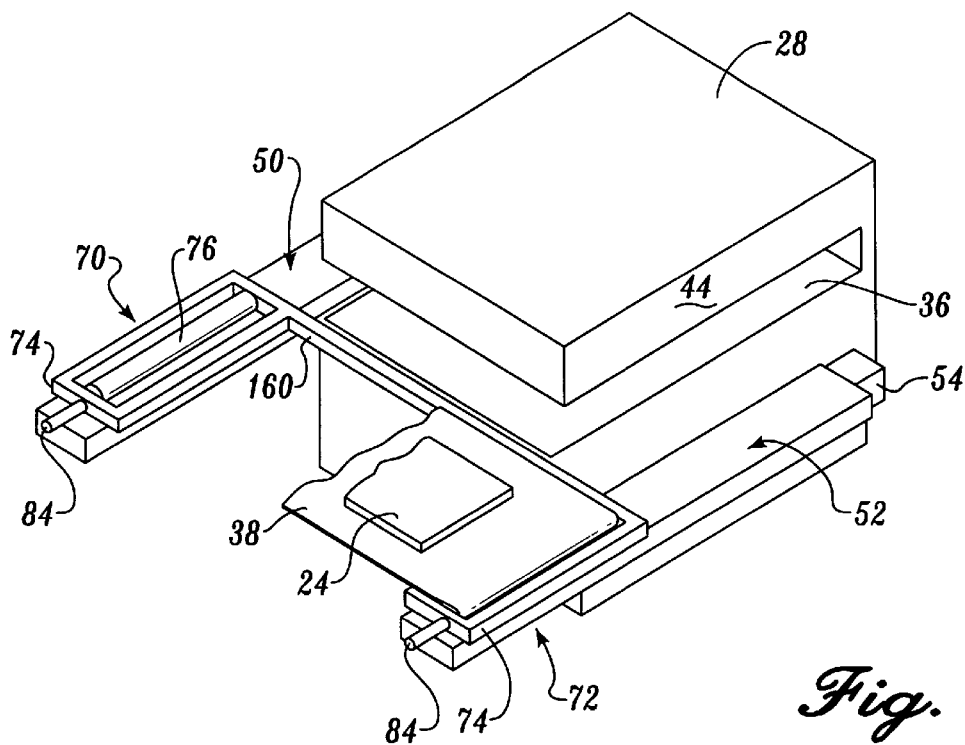
FIG. 11 is a perspective view of a first embodiment of a tensioning assembly formed in accordance with the present invention, with portions omitted for clarity.

The tensioning assemblies 70, 72 formed in accordance with the present invention, and shown in FIG. 11, each include a single roller 76 that extends substantially the entire longitudinal length of the tensioning assembly. The roller 76 is supported in the tensioning assembly elongate tray 74 using conventional methods. One end of the flexible support is wrapped around the roller of each tensioning assembly 70, 72 a few times, preferably such that support 38 rolls off the rollers 76 from the top, rather than the bottom of the rollers. The rollers may be formed of any sufficiently rigid material. In actual prototypes of the invention, the chosen materials were titanium or aluminum rollers having a diameter of 2-inches to 3-inches and a length of approximately 50-inches to 65-inches.

The torque supply system includes a reversible air motor 84 attached directly to one or both ends of each roller. FIG. 11 shows a single air motor 84 attached to the front end of the roller 76. The air motor 84 is energized by a suitable pressurized air source. Each air motor is capable of sustaining a given torque on its respective roller.

Other torque supply systems may be used instead of an air motor system (e.g., a mechanical spring system, a hydraulic system, an electric motor system, etc.) Whatever system is selected, it must be capable of preventing rotation of the rollers during oven transfer and be capable of being back driven under tensioning during pressing in order to sustain a specific tension on the core while still allowing the rollers to partially unwind.

The actual value of the torque provided by a given torque supply system will be dependent upon the requirements of a particular application. An example torque supply system may utilize air motors capable of supplying 20 ft-lbs torque using a constant supply of air pressure at 90 psig.

As will be appreciated by those skilled in the art, the embodiment of the tensioning assembly shown in FIG. 11 is suitable for shaping a honeycomb core about a simple convex contour upper die. Because there is no variation in the die shape along the Z-direction, the support neatly wraps around the die, equally compressing the core against the die at all core locations. As will also be appreciated by those skilled in the art, such a method and apparatus requires only an upper die. No lower die is required. The benefits of eliminating the lower die include: elimination of any mismatch (which occurs occasionally) between two dies; lower tooling costs; and faster tool setup time. Additionally, because the flexible support is heated with the core, less heat is lost than when a heated core is pressed against a cold lower die during pressing. After pressing, the flexible support dissipates heat more quickly than a lower die. (The period of time required for forming is generally less than the period of time required by the flexible support to switch from acting as a heat source to a heat sink.)

FIG. 12 shows a variation of the embodiment of the tensioning assembly shown in FIG. 11. The embodiment shown in FIG. 12 includes three rollers 88 and three reversible air motors 87 per tensioning assembly. The rollers 88 shown in FIG. 12 are similar to the rollers 76 shown in FIG. 11, only shorter in axial length. The rollers 88 of FIG. 12 are arranged parallel to one another, in a common horizontal plane. The single shaping apparatus flexible support 36 is replaced by three smaller-width flexible supports 86 positioned horizontally side-by-side. The side end of each support is wrapped about a single roller 88. Each roller 88 is rotated by an associated air motor 87. This tensioning assembly variation is most useful for upper dies with gentle complex convex contours. Using multiple flexible supports with such dies helps compress the core to the die without introducing significant complexity into the apparatus of the invention.

Other variations of the tensioning assemblies shown in FIGS. 11 and 12 are possible and will vary according to the die contour and the pressing force required. In general, such variations may require a greater or lesser number of flexible supports. The preferred arrangement is alternating rollers in outboard relation, i.e., a first roller is placed at one location, a second roller is placed closer in, a third is placed in axial alignment with the first roller, a fourth is placed in axial alignment with the second roller, etc. In this way, there is sufficient room for all air motors.

The air regulation or control system used with the tensioning assemblies illustrated in FIGS. 11 and 12 should be capable of coordinating the pressure and torque between adjacent and opposed air motors of the first and second tensioning assemblies such that portions of the core being shaped receive the same pressing force. This is most easily accomplished by using a constant pressure source for each air motor, the air pressure amounts between air motors being the same.

More specifically, during pressing, i.e., when the upper die is lowered onto the honeycomb core 24, the air motors 84 (or 87) provide a constant tension to the flexible support 38 (or 86) while the flexible support is unwinding from the rollers due to the core being pressed downward against the flexible support by the upper die 32. A simple regulation system uses constant (and equal) shop pressure sources attached to each air motor.

Figure 13:
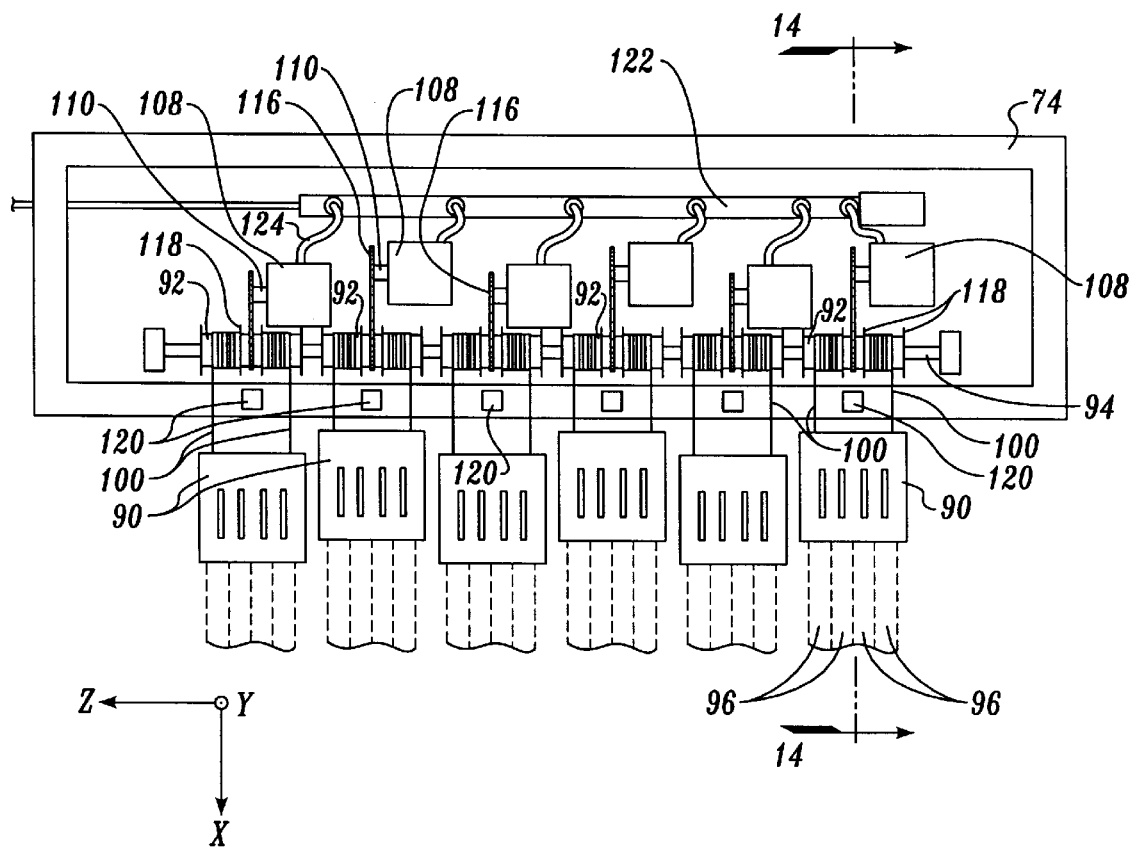
FIG. 13 is a top plan view of a second embodiment of a tensioning assembly formed in accordance with the present invention.

FIGS. 13–20 illustrate a more complex embodiment of a tensioning assembly formed according to the present invention. Each tensioning assembly includes a number of independent short rollers 92 (six rollers are shown in FIG. 13) positioned end-to-end along nearly the entire longitudinal length of the elongate tray 74. The short rollers 92 are mounted for independent rotation on a single shaft 94.

Figure 18:
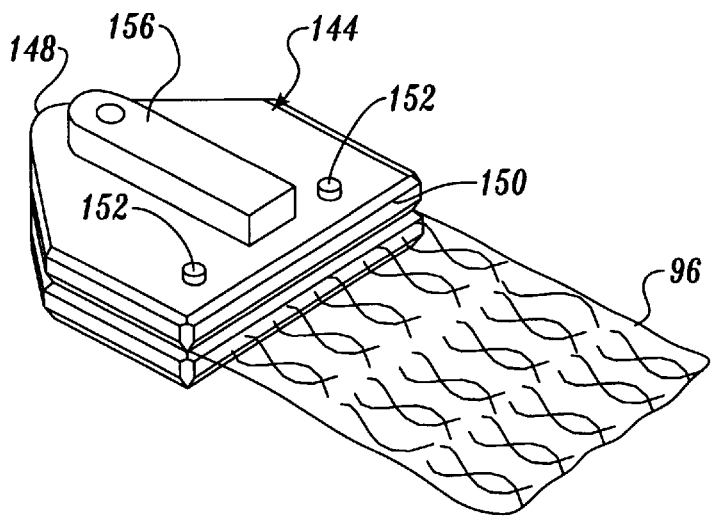
FIG. 18 is a perspective view of a translating bracket of the tensioning sub-assembly of FIG. 15.

The tensioning assembly shown in FIG. 13 also includes a number of flexible belts 96. The belts 96 are placed horizontally side-by-side in the X-Z plane. The belts 96 may be formed of the same material as the flexible support 38 described above, only much narrower in width. The belts 96 support the core 24 during heating and force the core against the upper die 32 during pressing. The end of each of the belts 96 is attached to a tensioning sub-assembly 90 instead of being attached directly to the short rollers 92. The manner of attachment illustrated in FIG. 18 is described in detail below. As described next, the tensioning assemblies are attached to the short rollers 92.

Figure 15:
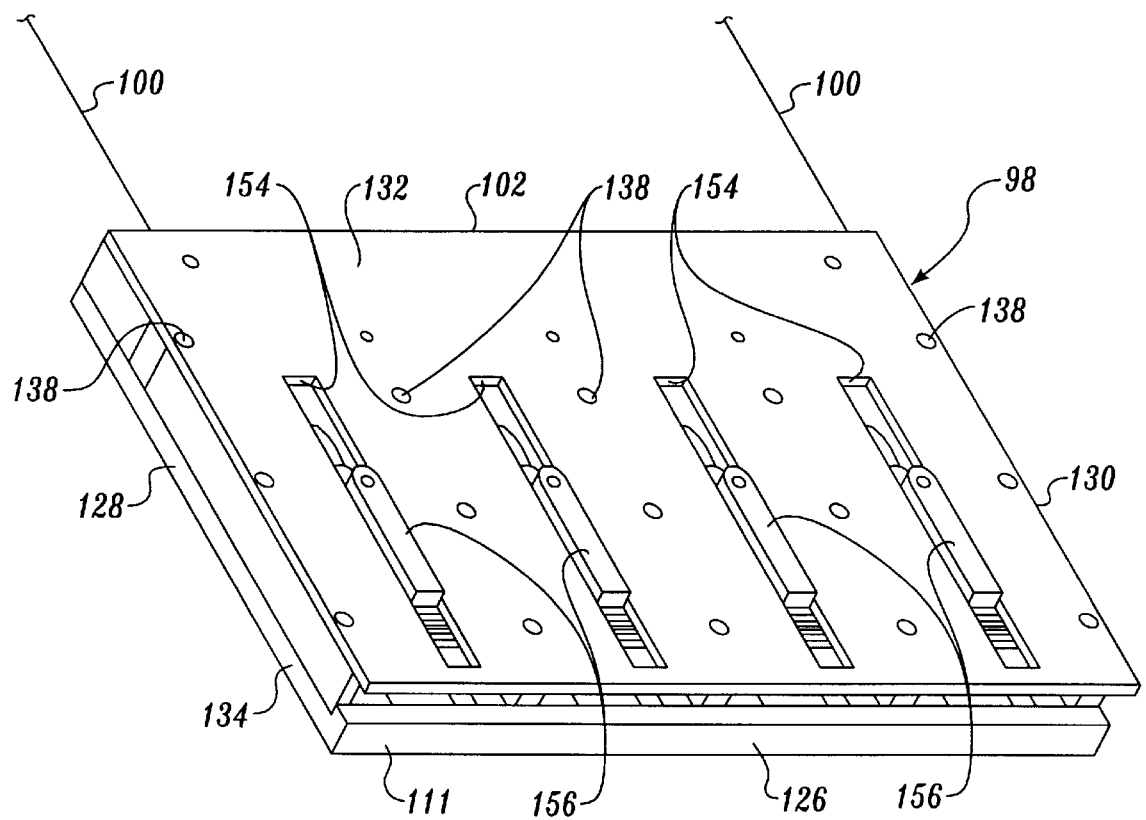
FIG. 15 is a perspective view of a tensioning sub-assembly of the tensioning assembly of FIG. 13.
Figure 16:
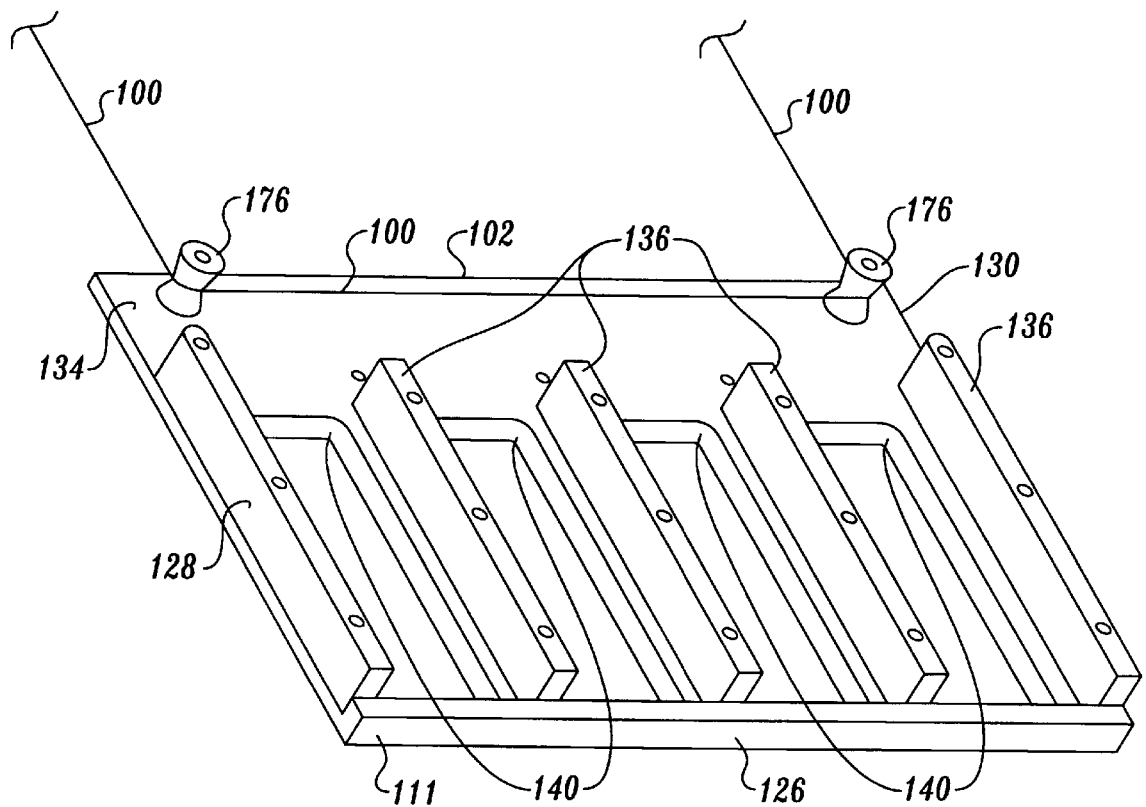
FIG. 16 is a perspective view of a portion of the tensioning sub-assembly of FIG. 15.

Referring to FIGS. 15 and 16, the tensioning sub-assemblies 90 include a generally square housing 98 having a roller cable 100 (or similarly strong flexible material) wrapped around two roller cable spools 176 attached to the inside surface of a housing back panel 134 near an upper surface 102 of the housing. More specifically, the roller cable 100 extends from the upper edge of the housing to have each of the cable's two ends wrap around a common short roller 92, as shown in FIG. 13. Also shown in FIG. 13 are optional ring-like roller cable guides 118 mounted on the short rollers to help guide the roller cable 100 around the short roller 92.

The torque supply system of the tensioning assemblies shown in FIGS. 13–20 includes a number of air motors 108, one for each short roller 92. The air motors 108 of FIG. 13 are mounted in the tray 74 in a staggered formation in order to optimize tray space usage. The staggering shown in FIG. 13 is accomplished by placing one air motor close to its short roller, the next far from its short roller, the third close to its short roller, etc. Alternatively, or in addition, the air motors 108 may be vertically staggered to save space as well.

Figure 14:
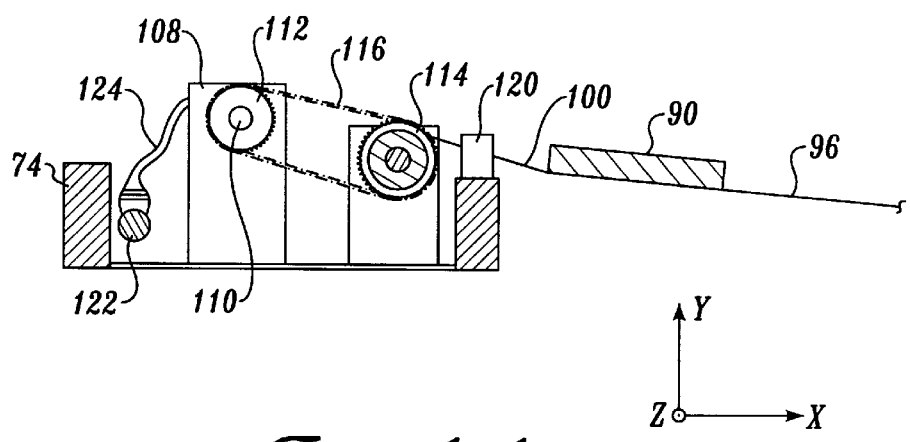
FIG. 14 is a cross-sectional view along line 14—14 of FIG. 13.

As shown in FIGS. 13 and 14, a sprocket chain mechanism is used to couple the air motor 108 to their related short rollers 92. More specifically, a drive sprocket 112 is mounted on the shaft 110 of each air motor 108. A drive chain 116 is wrapped around each of the drive sprockets 112 and a roller sprocket 112 that girdles the center periphery of an associated short roller 92. See FIG. 14. Attached to the tray 74 are six stops 120, shown in FIGS. 13 and 14. The stops 120 function to prohibit the roller cables 100 from winding so far onto the short rollers that they cause the tensioning sub-assemblies to come into contact with the roller sprocket 114, chain loop 116, or belt guides 118. The stops 120 therefore protect both the tensioning sub-assembly 90 and the tray components.

Also shown in FIGS. 13 and 14 are some of the components of the regulation system. In particular, a common air pressure supply line 122 having individual branches 124 to each air motor 108 is provided. The common line is attached to a supply of air pressure. The air pressure supplied to each air motor is held to a constant in order to equalize the tensioning capability of each of the air motors on their associated rollers. Any one of a number of known systems may be used for the regulation system, the precise configuration not being particularly important to the present invention.

The details of each tensioning sub-assembly are shown in FIGS. 15–20. In FIG. 15, each housing 98 is shown as including a lower side 126 and first and second sides 128, 130. The housing 98 is formed from the attachment of a square front panel 132 to a square back panel 134, with multiple elongate dividers 136 placed therebetween. See FIG. 16. The preferred panel material is aluminum. This attachment may be formed using any one of a number of known methods. Small transverse screws 138 are shown in FIG. 15. The roller cable spools 176 are attached between the front and back panels near the upper edge 102. The axial orientation of the spools 176 is transverse to the plane of the panels.

The elongate direction of the dividers 136 is oriented parallel to the housing side edges 128, 130. The dividers 136 are shorter in length than the distance between the housing upper surface 102 and lower side 126. The dividers are placed equa-distance from each other to form channels extending from the housing lower edge to nearly the top edge of the panels. At the lower edge 126 of the housing 98 is a bracket stop 111 spanning the width of the housing 98.

The number of dividers required will depend upon the number of channels required, which in turn corresponds with the number of flexible belts 96 attached to each tensioning sub-assembly 90. Five dividers are needed to form four channels for a tensioning sub-assembly accommodating four flexible belts. The numbers given here are exemplary and not to be construed as limiting. The present invention encompasses using other numbers depending on the needs of a particular application.

The dividers that are located inward of the front and back panel side edges, each have a stationary spool 142 (shown in FIGS. 17 and 20) secured near their upper ends, between the front and back panels, the axis of rotation of the spools 142 being transverse to the plane of the front and back panels 132, 134. The stationary spools 142 are located near the upper housing surface 102 and are capable of rotation in either direction. The spools 142 are preferably formed of stainless steel.

Figure 17:
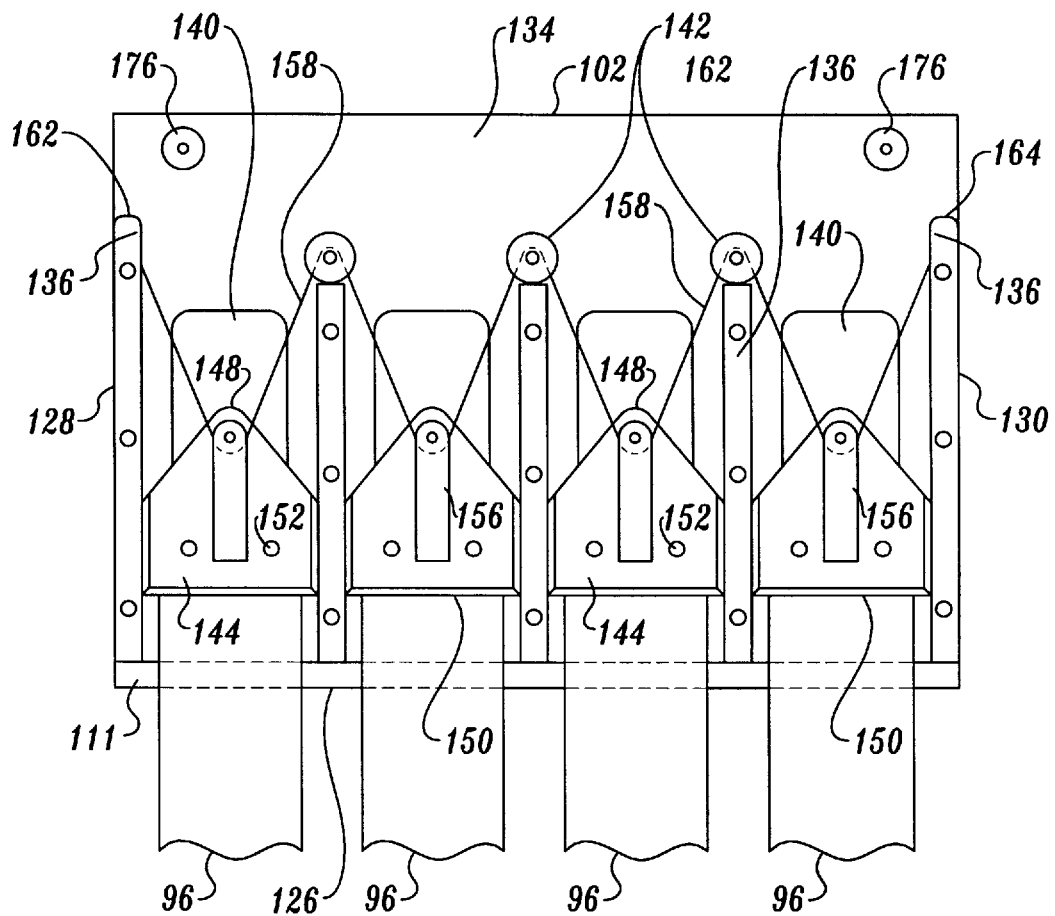
FIG. 17 is a top plan view of a portion of the tensioning sub-assembly of FIG. 15 with the front panel removed.

Referring to FIG. 17, a translating bracket 144 is located in each channel. Each bracket 144 is sized to slide easily within its channel, loosely contacting the dividers and the inner surfaces of the front and back panels. Referring to FIG. 16, the back panel 134 may optionally include one or more lubrication access holes 140 for lubricating the translating brackets. The translating brackets 144 are preferably formed of phenolic.

Figure 19:
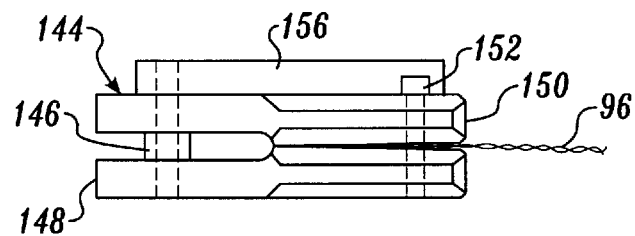
FIG. 19 is a side elevational view of the translating bracket of FIG. 18.
Figure 20:
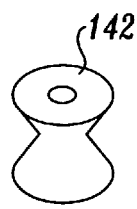
FIG. 20 is a perspective view of a stationary spool of the tensioning sub-assembly of FIG. 15.

As shown in FIG. 19, each translating bracket includes an upper edge 148 lying closest to the housing upper surface, a lower edge 150 opposite the upper edge, and an internal rod 146 located near the upper edge 148. The internal rod is mounted to rotate in either direction. The axis of rotation of the internal rod 146 is generally parallel to the axis of rotation of the stationary spools 142. One end of a flexible belt 96 is attached to a translating bracket 144 through the bracket's lower edge 150. This attachment may be accomplished in one of a number of known ways. Shown in FIG. 19 are transverse bolts 152.

Referring to FIGS. 15 and 17–19, each translating bracket 144 further includes a guide 156 secured to the surface of the bracket that is adjacent the front panel 132. The front panel 132 includes a number of slots 154 for accommodating the guides 156, one translating bracket guide extending into each slot. The slots are sized to correspond to the location of the guide when the bracket is in uppermost region of its channel (i.e., retracted position) to the location of the guides when the bracket is in the lowermost region of its channel (i.e., extended position). The slots guide the bracket guides 156, and hence the brackets and flexible belts, in going between their extended and retracted positions. The housing bracket stop 111 further helps to contain the translating brackets 144 in their respective channels.

The housing 98 further includes a single internal cable 158 having two ends. One end is secured to the housing near one upper edge comer 162, and the other end is secured to the housing near the other upper edge comer 164. See FIG. 17. Between the two upper comers 162, 164, the internal cable 158 is connected between the translating bracket internal rods 146 and the stationary spools 142, in alternating fashion, as shown in FIG. 17. As will be appreciated by those skilled in the art, the tensioning sub-assembly is basically a pulley device where the overall tension provided by any one roller is divided equally among its flexible belts. Thus, slack occasioned by a belt covering a small upper die cross section distance is consumed by belts experiencing less slack.

During the pressing operation using a tensioning assembly of the type shown in FIGS. 13–20, when the upper die is lowered onto the honeycomb core 24, the core and flexible belts begin to unwind off the short rollers via the roller cables 100. During this time, the air regulation system ensures that the air motors provide equal tension between tensioning sub-assemblies through each air motor's respective roller. The tensioning sub-assemblies themselves further distribute tensioning equally among their flexible belts by extending and retracting the brackets in the channels. The internal cable running between the translating brackets ensures that equal force is applied by each flexible belt to the honeycomb core being shaped.

As will be appreciated by those skilled in the art, the embodiment of the tensioning assembly shown in FIGS. 13–20 is ideally suited for shaping a honeycomb core about a complex convex contour upper die. The use of multiple flexible belts 96, tensioning sub-assemblies 90, and a regulation system accomplishes an even distribution of tension between all flexible belts. Therefore, variation in the die shape along the Z-direction is accommodated because the core receives the same pressing force at all locations. Such a tensioning assembly requires only an upper die. As discussed above, elimination of the lower die is a significant improvement over prior art methods and apparatus.

For multi-faceted dies, an alternative method is used. In this method, shaping of the core is accomplished by maintaining the core on the flexible support and pressing the core and the support, together, between the upper and a lower die. The lower die is necessary for multi-faceted die curve due to its surface shape inflection variations.

To accomplish this method, the apparatus of the present invention is likewise altered. In particular, both an upper and lower die are included, and the regulation system is set to eliminate tension in the flexible support during pressing. The tensioning assembly provides tension only when the core is being heated and transferred to and from the oven. During core pressing, there is no tension on the flexible support.

The lower die is positioned below the core, adjacent the flexible support: the upper die is positioned above the core, adjacent the core's upper surface. The lower die is the reverse-image shape of the upper die. This embodiment of the present invention is useful mainly for gently curved honeycomb core products. Tight corners tend to cause the support to bunch up between the dies. The remaining aspects in this alternative method and apparatus are the same as described above, including the availability of using any of the various embodiments of the tensioning assemblies.

Although the alternative method and apparatus embodiment offers no benefits resulting from the elimination of a die, it is still an improvement over current methods and apparatus. Utilizing a flexible support to transfer the core to the oven and support the core during forming provides a faster method of shaping the core, since there is no need to wait for support rods to retract or to wait for a worker to properly adjust the core on the lower die. In addition, the flexible support provide a degree of insulation between the core and the cold lower die, thus raising the initial compression temperature and helping to maintaining an increased temperature during compression.

While the preferred embodiment of the invention has been illustrated and described, it will be appreciated that various changes can be made therein without departing from the spirit and scope of the invention. One variation is to utilize just the tensioning assembly and die(s) without providing for translation into an adjacent oven via guide assemblies. Such an embodiment is not preferred, however, since it requires handling of the core between heating and pressing which can cause core temperature loss, and misalignments.

The embodiments of the invention in which an exclusive property or privilege is claimed are defined as follows:

1. A method of shaping a layer of settable material, the steps comprising:
   (a) placing the layer of settable material on a flexible support;
   (b) translating the flexible support with settable material to a heat source;
   (c) heating the settable material to a desired forming temperature;
   (d) translating the flexible support with settable material from the heat source to a forming area; and
   (e) pressing the settable material using a die having a particular shape, the pressing occurring between the die and the flexible support by tensioning the flexible support so that the settable material is forced to conform to the shape of the die.

2. The method of shaping according to claim 1, wherein pressing further includes coordinating tension between portions of the flexible support so that a pressing force is substantially uniform over the entire layer of settable material.

3. The method of shaping according to claim 1, wherein the die is a convex contour die.

4. The method of shaping according to claim 1, wherein the heat source is positioned adjacent the forming area and wherein pressing occurs immediately after translating the flexible support with settable material from the heat source.

5. The shaping method of claim 1, further comprising:
   (a) providing first and second tensioning assemblies, each including at least one roller and at least one torque supply system for rotating the at least one roller; the flexible support having one end rotatably connected to the at least one roller of the first tensioning assembly and an opposite end rotatably connected to the at least one roller of the second tensioning assembly; and
   (b) providing a regulation system operably engaged with the at least one torque supply systems of both the first and second tensioning assemblies, the regulation system equalizing tension between the ends of the flexible support and keeping the torque supply systems operating in unison.

6. The shaping method according to claim 5, wherein each torque supply system includes at least one air motor in communication with its respective roller and capable of sustaining a constant torque on the roller and wherein the regulation system includes a constant air pressure source attached to the air motors.

7. The shaping method according to claim 1, wherein translating the flexible support includes using a guide assembly attached to the first and second tensioning assemblies.

8. The shaping method according to claim 1, wherein the die is a male die and the flexible support includes at least two flexible belts positioned side-by-side and attached at their first ends to a first tensioning sub-assembly and attached at their second ends to a second tensioning sub-assembly, the first and second tensioning sub-assemblies being rotationally connected to opposed rollers, the opposed rollers providing tensioning of the flexible support and the first and second tensioning sub-assemblies equalizing tension between the at least two flexible belts.

9. The shaping method according to claim 8, wherein each tensioning sub-assembly comprises:
   (a) a translating bracket attached to each flexible belt end;
   (b) a housing having adjacent channels, each channel for receiving and containing one translating bracket with flexible belt end; and
   (c) a cable interconnecting the translating brackets, whereby tension is equalized between the flexible belts via the cable acting on the translating brackets.

10. A method of shaping a layer of settable material, the steps comprising:
    (a) placing the layer of settable material on a heat resistant flexible support positioned in a forming area;
    (b) translating the flexible support with settable material into a heat source positioned adjacent to the forming area;
    (c) heating the settable material to a desired forming temperature in the heat source;
    (d) translating the flexible support with settable material from the heat source into the forming area; and
    (e) pressing the settable material and the flexible support between an upper die and a lower die.

11. The method of shaping according to claim 10, wherein the flexible support includes a number of flexible belts disposed side-by-side to each other.

12. The method of shaping according to claim 10, wherein the flexible support is attached to a guide assembly and wherein translating the flexible support with settable material into and from the heat source includes actuating the guide assemble.

13. The method of shaping according to claim 10, wherein the flexible support is attached between first and second tensioning assemblies capable of applying tension to the flexible support and wherein translating the flexible support with settable material into and from the heat source includes actuating a tensioning assembly to cause the flexible support to remain in a substantially horizontal orientation.

14. The method of shaping according to claim 13, further including actuating the tensioning assembly to eliminate tension in the flexible support during pressing.

15. The shaping method according to claim 10, wherein:
    (a) the flexible support is attached between first and second tensioning assemblies capable of applying tension to the flexible support, each tensioning assembly comprising a number of rollers mounted end-to-end on a shaft and a number of torque supply systems, one torque supply system for each roller;
    (b) the flexible support including at least two flexible belts positioned side-by-side and attached at their first ends to a first tensioning sub-assembly and attached at their second ends to a second tensioning sub-assembly, the first tensioning sub-assembly being rotationally connected to a roller of the first tensioning assembly, the second tensioning sub-assembly being rotationally connected to a roller of the second tensioning assembly, the first and second tensioning sub-assemblies equalizing tension between the at least two flexible belts; and (c) a regulation system engaged with the torque supply systems of both the first and second tensioning assemblies, the regulation system maintaining a desired amount of torque between each torque supply system and equalizing tension between tensioning sub-assemblies.

16. The shaping method according to claim 15, wherein each torque supply system includes at least one rotary actuator in communication with its respective roller and capable of sustaining a constant torque thereon.

* * * * *